(12) United States Patent
Glauning et al.

(10) Patent No.: US 7,671,563 B2
(45) Date of Patent: Mar. 2, 2010

(54) ELECTRICAL DEVICE WITH A SWIVELABLE RECHARGEABLE BATTERY PACK

(75) Inventors: Rainer Glauning, Aichtal-Groetzingen (DE); Jan Breitenbach, Stuttgart (DE); Wolf Matthias, Stuttgart (DE); Marcin Rejman, Waiblingen (DE); Josef Baumgartner, Stuttgart (DE); Thorsten Seidel, Remseck Am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 372 days.

(21) Appl. No.: 11/696,276

(22) Filed: Apr. 4, 2007

(65) Prior Publication Data
US 2007/0236172 A1    Oct. 11, 2007

(30) Foreign Application Priority Data
Apr. 7, 2006    (DE) .................... 10 2006 018 007

(51) Int. Cl.
*H01M 10/46* (2006.01)
(52) U.S. Cl. .................................................... 320/114
(58) Field of Classification Search .................. 320/107, 320/111, 112, 114, 115
See application file for complete search history.

(56) References Cited

U.S. PATENT DOCUMENTS

| 3,802,524 | A | * | 4/1974 | Walter ........................ 180/907 |
| 5,859,523 | A | * | 1/1999 | Nierescher et al. .......... 320/111 |
| 6,014,009 | A | * | 1/2000 | Wierzbicki et al. ......... 320/107 |
| 6,204,631 | B1 | * | 3/2001 | Kaiwa et al. ................ 320/107 |
| 6,573,683 | B2 | * | 6/2003 | Chang ........................ 320/107 |

* cited by examiner

*Primary Examiner*—Edward Tso
(74) *Attorney, Agent, or Firm*—Michael J. Stricker

(57) ABSTRACT

An electrical device has an electrical device body, a rechargeable battery pack that can be removed from the electrical device body, and a fastening unit for attaching the rechargeable battery pack to the electrical device body. It is provided that the fastening unit is designed such that electrical contact between the electrical device body and the rechargeable battery pack is established during an attaching motion.

8 Claims, 2 Drawing Sheets

ELECTRICAL DEVICE WITH A SWIVELABLE RECHARGEABLE BATTERY PACK

CROSS-REFERENCE TO A RELATED APPLICATION

The invention described and claimed hereinbelow is also described in German Patent Application DE 102006018007.0 filed on Apr. 7, 2006. This German Patent Application, whose subject matter is incorporated here by reference, provides the basis for a claim of priority of invention under 35 U.S.C. 119(a)-(d).

BACKGROUND OF THE INVENTION

The present invention relates to an electrical device.

A charging device for charging a rechargeable battery pack is known. This charging device includes a fastening interface for attaching the rechargeable battery pack.

SUMMARY OF THE INVENTION

The present invention is based on an electrical device with an electrical device body, a rechargeable battery pack that can be removed from the electrical device body, and a fastening unit for attaching the rechargeable battery pack to the electrical device body.

It is provided that the fastening unit is designed such that electrical contact between the electrical device body and the rechargeable battery pack is established during an attaching motion. A high level of operator comfort can be attained as a result. In addition, components and installation space can be spared, since the additional step of actuating a contacting unit in order to establish electrical contact is eliminated. The electrical device body can be designed as a charging station for charging the rechargeable battery pack.

As an alternative or in addition, the electrical device body can be an electrical consumer that is supplied with electrical energy from the rechargeable battery pack in order to operate. It can be designed as a power tool in particular. An "attaching motion" can be understood to mean, in particular, a motion of the rechargeable battery pack relative to the electrical device body, with which the rechargeable battery pack is brought into a state in which it is attached to an electrical device body.

It is also provided that the attaching motion includes a first submotion with a first direction of motion, and at least one second submotion with a second direction of motion that differs from the first direction of motion. As a result, it is possible to obtain a reliable fastening mechanism that has a great deal of flexibility in terms of designing the fastening unit.

A particularly simple design of the fastening unit can be attained, in particular, when at least one submotion is a swivel motion. A particularly intuitive operation of the electrical device can be attained, in particular, when the first submotion is a translatory motion, and the second submotion is a swivel motion.

In a preferred embodiment it is provided that the electrical device includes a retaining means that hold the rechargeable battery pack in place while a submotion is being carried out. As a result, it is possible to obtain a fastening mechanism that is particularly reliable and easy to operate. The retaining means preferably hold the rechargeable battery pack in place while the second submotion is being carried out.

In this context it is provided that the retaining means include an arresting means for stopping the first submotion. A fastening mechanism with a particularly compact design can therefore be attained, since an additional arresting step can be eliminated.

A simple procedure for attaching the rechargeable battery pack can also be attained when at least one submotion is a swivel motion and the retaining means define a pivot axis of the swivel motion.

In an advantageous embodiment it is provided that the retaining means are formed by an insertion region for insertion of the rechargeable battery pack, by way of which a fastening mechanism that is intuitive to operate can be attained.

It is also provided that the retaining means are provided in order to prevent the rechargeable battery pack from making a translatory detaching motion after the second submotion is carried out. As a result, a particularly reliable fastening mechanism can be attained. In particular, an advantageous safeguard against accidental detachment of the rechargeable battery pack, e.g., due to accidental actuation of the rechargeable battery pack or due to gravity, can be attained. In particular, the retaining means can be provided in order to prevent any translatory detaching motions of the rechargeable battery pack from occurring after the second submotion is carried out.

Advantageously, the retaining means are defined by an insertion region that is provided for insertion of the rechargeable battery pack. The insertion region is designed such that it allows the rechargeable battery pack to be inserted in a translatory direction into an unlocked position and, after the rechargeable battery pack is inserted, it allows it to be rotated around at least one axis of rotation into a locked position. After this rotation, the retaining means—i.e., an undercut section of the retaining means, in particular—preferably interact with the rechargeable battery pack in a form-fit manner such that the rechargeable battery pack cannot be detached, at least in the direction of the translatory motion.

A particularly robust retention of the rechargeable battery pack can be attained when the retaining means include means for engaging behind a subregion of the rechargeable battery pack. In particular, a large contact surface for placement against the rechargeable battery pack can be formed.

In a further embodiment of the present invention it is provided that the electrical device includes a contacting means that engage in a recess of the rechargeable battery pack when the attaching motion is carried out. As a result, a particularly simple contacting mechanism and a compact design of the rechargeable battery pack can be attained.

Further advantages result from the description of the drawing, below. An exemplary embodiment of the present invention is shown in the drawing. The drawing, the description and the claims contain numerous features in combination. One skilled in the art will also advantageously consider the features individually and combine them to form further reasonable combinations.

DESCRIPTION OF THE PREFERRED EMBODIMENTS

Figure 1:
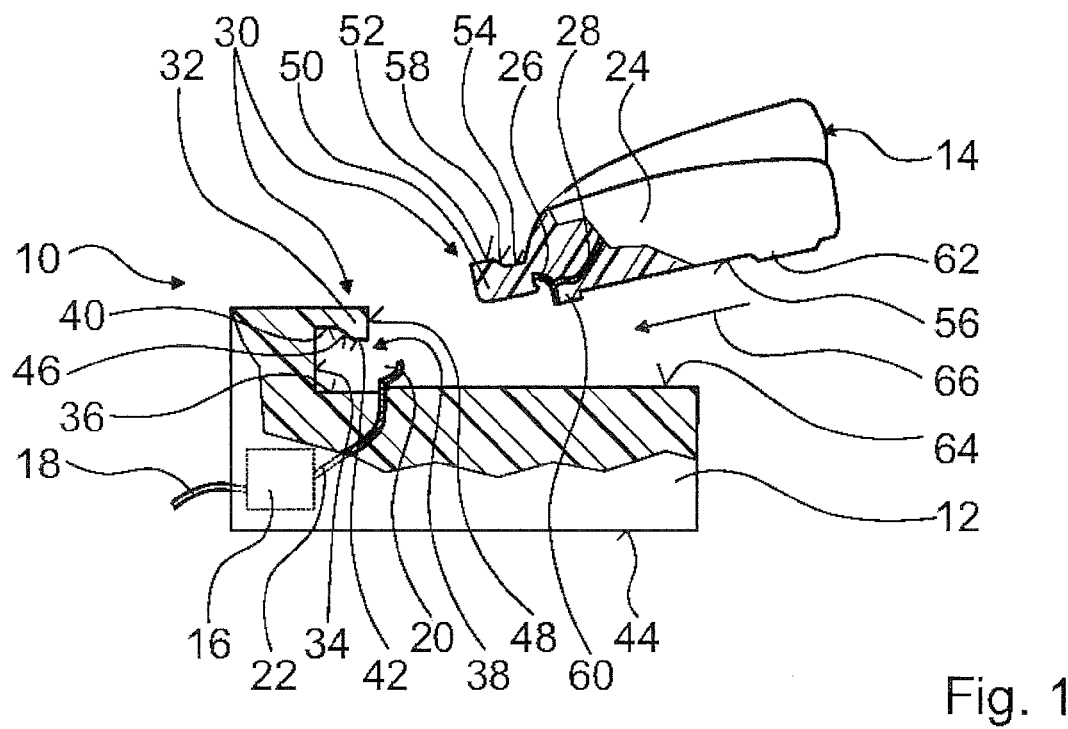
FIG. 1 shows a charging device and a rechargeable battery pack, which is being inserted into a region of the charging device in accordance with the present invention.

FIG. 1 shows an electrical device 10 that includes an electrical device body 12 designed as a charging device, and a rechargeable battery pack 14. The electrical device body 12 includes a housing. A charging unit 16 is located in the housing, which generates a charging current to charge rechargeable battery pack 14 during operation. Charging unit 16 is supplied with electrical energy during operation via a mains supply 18. Metallic contact means 20 are also connected to charging unit 16 via an electrical connection 22. Rechargeable battery pack 14 includes a housing 24 in which not-shown rechargeable cells are located. It also includes contacting means 26 which are provided to establish an electrical connection with charging unit 16 via a contacting of contact means 20. Contacting means 26 are connected with the rechargeable cells via an electrical connection 28.

To attach rechargeable battery pack 14 to electrical device body 12, electrical device 10 is provided with a fastening unit 30. Fastening unit 30 includes a projection that is integrally formed with electrical device body 12. This projection is designed as retaining means 32, which are provided for holding rechargeable battery pack 14 in place while it is being attached. The method of operation of retaining means 32 is illustrated in greater detail with reference to FIG. 2. In interaction with two outer surfaces 34, 36 of electrical device body 12, retaining means 32 form an insertion region 38, into which rechargeable battery pack 14 is inserted in order to be attached. Retaining means 32 also include two contact surfaces 40, 42, which are offset relative to each other.

Contact surfaces 40, 42 are connected via a further contact surface 46 that is slanted relative to a base side 44 of electrical device body 12. Contact surfaces 40, 42, 46 bear against rechargeable battery pack 14 when the latter is attached. Retaining means 32 also form a front surface that is designed as arresting means 48, the function of which is described in greater detail with reference to FIG. 2. On the side of rechargeable battery pack 14, fastening unit 30 includes a subregion 50 of rechargeable battery pack 14, which is designed as an extension of housing 24. During attachment, subregion 50 is inserted into insertion region 38 of electrical device body 12 and—as described with reference to the following figures—enables rechargeable battery pack 14 to be attached to electrical device body 12 in interaction with retaining means 32.

Subregion 50 forms two contact surfaces 52, 54, which are offset relative to each other and are connected via a contact surface 58 that is slanted relative to a base side 56 of housing 24. Contact surfaces 52, 54, 58 bear against electrical device body 12 when rechargeable battery pack 14 is attached. Housing 24 also includes two support means 60, 62 for supporting rechargeable battery pack 14, which bear against a contact surface 64 of electrical device body 12 when rechargeable battery pack 14 is attached to electrical device body 12.

Rechargeable battery pack 14 is attached to electrical device body 12 via an attaching motion, which can be broken down into two submotions. With a first submotion, rechargeable battery pack 11 is moved in a translatory manner by a user in a first direction of motion 66. With this submotion, subregion 50 of rechargeable battery pack 14 is inserted into insertion region 38.

Figure 2:
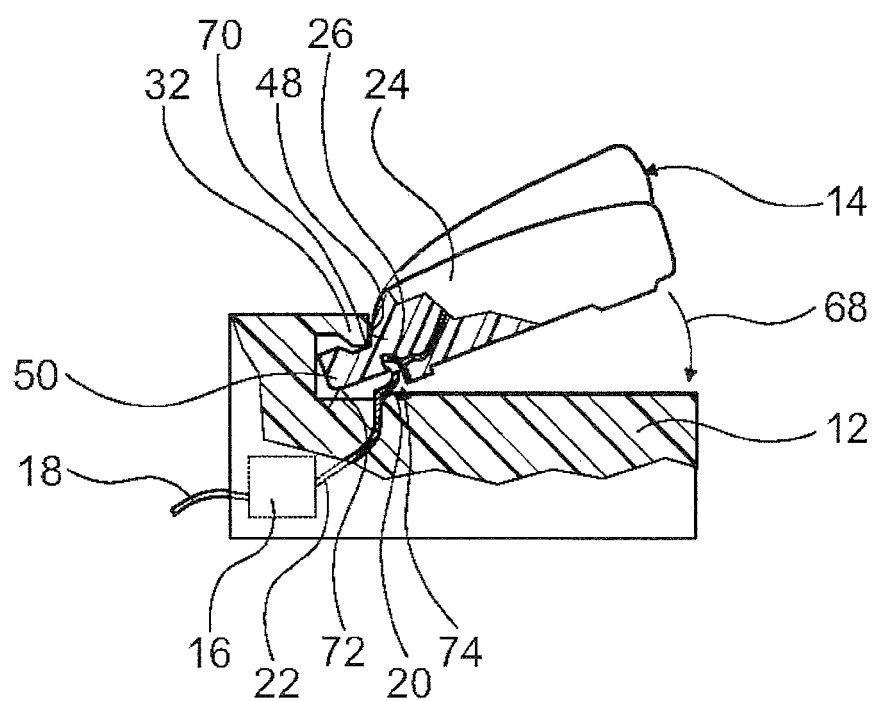
FIG. 2 shows a swivel motion of the rechargeable battery pack which is supported in the region in accordance with the present invention.

Rechargeable battery pack 14 is depicted in FIG. 2, and subregion 50 is located in the insertion region. The first submotion is stopped by arresting means 48, i.e., by rechargeable battery pack 14 impacting arresting means 48, which are designed as the front surface of retaining means 32. After this impact occurs, a second submotion of the attaching motion takes place. In the second submotion, rechargeable battery pack 14 is swiveled in a second direction of motion 68, which is designed as a swivel direction. In the first submotion, retaining means 32—as viewed from base side 44 of electrical device body 12—engages behind subregion 50 of rechargeable battery pack 14. As a result, rechargeable battery pack 14 is held in place by retaining means when the second submotion is carried out. Retaining means 32 also define a pivot axis 70 for the swivel motion.

Pivot axis 70 is formed by a support axis of retaining means 32, against which rechargeable battery pack 14 bears. In this example, this support axis is an edge of retaining means 32. When the first submotion is carried out, contact means 20—which are designed as a spring-loaded contact hook—are pressed by a lower surface 72 of rechargeable battery pack 14, and a return force of contact means 20 is produced. When the second submotion is carried out, i.e., when rechargeable battery pack 14 is swiveled around pivot axis 70, contact means 20 slide along lower surface 72 until they engage in and snap into a recess 74 of rechargeable battery pack 14.

During this engagement, contact means 20 come in contact with contacting means 26. As a result, electrical contact is established between rechargeable battery pack 14 and charging unit 16. The type of contacting between contact means 20 and contacting means 26 described here that occurs during the swivel motion is independent of the placement of contacting means 26 in rechargeable battery pack 14. In one embodiment, the contacting can be established, e.g., in the rear region of rechargeable battery pack 14, which is located opposite to subregion 50. A contacting in the middle of rechargeable battery back 14, e.g., between support means 60, 62, is also feasible. It is also feasible that—as an alternative to or in addition to subregion 50—the rear region is designed for fastening rechargeable battery pack 14 to electrical device body 12. In the attached state, housing 24 can be enclosed by electrical device body 12.

Figure 3:
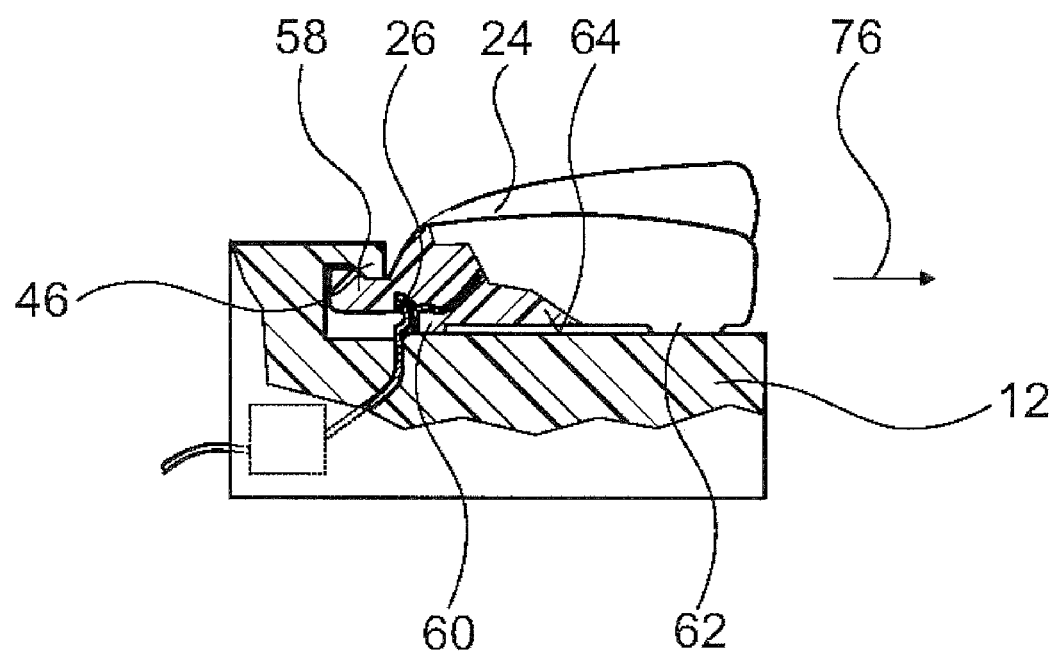
FIG. 3 shows the charging device and the rechargeable battery pack, which is attached in the region of the charging device in accordance with the present invention.

The swivel motion is stopped when support means 60, 62 come in contact with contact surface 64. This end state is shown in FIG. 3. The end state that exists after the second submotion is carried out corresponds to the attached state of rechargeable battery pack 14. In this state, contact surfaces 52, 54, 58 of rechargeable battery pack 14 bear against contact surfaces 40, 42 and 46. The fact that contact surface 46 bears against contact surface 58 prevents a translatory motion of rechargeable battery pack 14 from taking place in a direction 76 parallel to base side 44 of electrical device body 12, thereby preventing rechargeable battery pack 14 from accidentally becoming detached. To remove rechargeable battery pack 14, it must be swiveled in the direction that is opposite to direction of motion 68.

It will be understood that each of the elements described above, or two or more together, may also find a useful application in other types of constructions differing from the type described above.

While the invention has been illustrated and described as embodied in an electrical device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. An electrical device, comprising an electrical device body; a rechargeable battery pack that is removable from said electrical device body; and a fastening unit for attaching said rechargeable battery pack to said electrical device body, said fastening unit being configured such that electrical contact between said electrical device body and said rechargeable battery pack is established during an attaching motion, wherein said fastening unit is configured so that said attaching motion includes a first sub motion with a first direction of motion and at least one second sub motion with a second direction of motion that differs from said first direction of motion, and wherein said fastening means is configured so that at least one said sub motions is a swivel motion of the rechargeable battery rack relative to the electrical device body.

2. An electrical device as defined in claim 1; and further comprising retaining means for holding said rechargeable battery pack in place while one of said submotions is being carried out.

3. An electrical device as defined in claim 2, wherein said retaining means includes an arresting means for stopping said first submotion.

4. An electrical device as defined in claim 3, wherein at least one of said submotions is a swivel motion, said retaining means defining a swivel axis of said swivel motion.

5. An electrical device as defined in claim 3, wherein said retaining means define an insertion region for insertion of said rechargeable battery pack.

6. An electrical device as defined in claim 3, wherein said retaining means are configured for preventing said rechargeable battery pack from making a translatory detaching motion after said second submotion is carried out.

7. An electrical device as defined in claim 3, wherein said retaining means include means for engaging behind a subregion of said rechargeable battery pack.

8. An electrical device as defined in claim 1; and further comprising contact means engaging in a recess of said rechargeable battery pack when said attaching motion is carried out.

* * * * *